United States Patent [19]

Ottenstein

[11] 3,952,759

[45] Apr. 27, 1976

[54] LIQUID LINE BREAK CONTROL SYSTEM AND METHOD

[75] Inventor: Sidney Allan Ottenstein, Spring, Tex.

[73] Assignee: M & J Valve Company, Houston, Tex.

[22] Filed: Aug. 14, 1974

[21] Appl. No.: 497,248

[52] U.S. Cl. ............................. 137/12; 137/487.5; 73/40.5 R; 235/151.34
[51] Int. Cl.² ..................................... F16K 31/00
[58] Field of Search ............ 137/12, 14, 2, 1, 487.5; 235/151.34; 73/40.5 R

[56] References Cited
UNITED STATES PATENTS

| | | | |
|---|---|---|---|
| 3,612,081 | 10/1971 | Williams | 137/12 |
| 3,665,945 | 5/1972 | Ottenstein | 137/14 |
| 3,776,249 | 12/1973 | Wailes | 137/14 |
| 3,851,521 | 12/1974 | Ottenstein | 73/40.5 R |

Primary Examiner—Martin P. Schwadron
Assistant Examiner—Robert J. Miller
Attorney, Agent, or Firm—Flehr, Hohbach, Test, Albritton & Herbert

[57] ABSTRACT

System and method for automatically closing flow control valves and/or actuating an alarm in the event of a leak or break in a liquid pipeline. The occurrence of a leak or break is determined first by detecting the negative pressure wave which accompanies the leak or break and then by monitoring the rate of static pressure drop on the downstream side of the valve. False alarms and undesired valve closing in response to normal disturbances in the line are avoided by distinguishing between negative pressure waves originating on the upstream and downstream sides of the valve and responding only to the negative waves of downstream origin. Additional protection is provided by continuously monitoring the static pressure on the upstream side of the valve and closing the valve and/or actuating the alarm in the event that pressure falls and remains below a predetermined level.

20 Claims, 4 Drawing Figures

LIQUID LINE BREAK CONTROL SYSTEM AND METHOD

BACKGROUND OF THE INVENTION

This invention pertains generally to fluid flow pipelines and more particularly to a system and method for interrupting the flow of liquid in a pipeline in the event of a break or leak in the line.

It has been found that a sudden leak or break in a pipeline carrying liquid, such as petroleum products, under pressure is accompanied by a rapid drop in static pressure which is propagated away from the leak or break as a negative pressure wave. Such negative pressure waves travel through the flowing liquid with a velocity corresponding to the velocity of sound in the liquid. Heretofore, such negative pressure waves have been utilized for detecting and locating the position of a leak or break in the pipeline.

Pipelines used for petroleum products and other liquids are commonly provided with pumping stations and valves spaced along the line for pressurizing the liquid and controling the flow in the line. One or more of the valves can be closed to isolate a portion of the line in which a leak or break occurs, and in many instances it would be desirable to have a valve close automatically in the event of a leak or break.

If it were not for certain transient disturbances which tend to occur in the normal operation of a pipeline carrying liquid, it would be feasible to utilize the negative pressure wave which accompanies the leak or break in the line as a criterion for initiating automatic valve closing to isolate the leak or break. Such disturbances tend to occur, for example, when the pump at a pumping station is shut down or a control valve is closed or operated rapidly, and these disturbances are accompanied by negative pressure waves similar to those which accompany line breaks. In view of the difficulty of determining whether a negative pressure wave is generated by a leak or by normal pipeline operation, negative pressure waves are generally not used as the criteria for initiating automoatic valve closing in liquid lines.

It has been found that a negative pressure wave or rapid drop in static pressure can be utilized in an automatic valve control system for liquid pipelines if the response of the system is limited to negative waves originating on the downstream side of the system. In this regard, it has been noted that while pumping stations located along a pipeline produce high output pressures, their input suction pressures are relatively low. In normal operation, the suction pressure remains fairly constant, and any negative pressure waves generated by a pumping station are generally limited to the portion of the pipeline which is downstream of the pumping station. By limiting the operation of the valve control system to negative pressure waves originating downstream of the system, the problem of shutting the pipeline down in response to the action of a pump or valve in the normal operation of the line is effectively eliminated.

SUMMARY AND OBJECTS OF THE INVENTION

In the system and method of the invention, pipeline static pressure is sampled on both the upstream and downstream sides of a valve. In the event that a negative pressure wave originating on the downstream side of the valve is detected, the rate of static pressure drop on the downstream side is monitored, and if this pressure is dropping at a rate corresponding to a leak or break, the valve is closed or an alarm is actuated. The origin of a negative pressure wave is determined by the sequence in which it is detected on the two sides of the valve, a negative wave originating downstream arriving at the downstream detector before the upstream detector. Additional protection is provided by continuously monitoring the static pressure on the upstream side of the valve and closing the valve or giving an alarm in the event that the upstream pressure falls below a predetermined level.

It is in general an object of the invention to provide a new and improved system and method for closing a flow control valve in the event of a break or leak in a liquid pipeline.

Another object of the invention is to provide a system and method of the above character in which the occurrence of a leak or break is detected by a rapid decrease in static pressure or a negative pressure wave originating on the downstream side of the valve.

Another object of the invention is to provide a system and method of the above character in which valve operation is also initiated in the event that the static pressure on the upstream side of the valve falls below a predetermined level.

Another object of the invention is to provide a system and method of the above character in which negative pressure waves generated by leaks or breaks can be distinguished from negative pressure waves occuring in normal pipeline operation.

Another object of the invention is to provide a system and method of the above character in which includes means for actuating an alarm in the event that a leak or break is detected.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
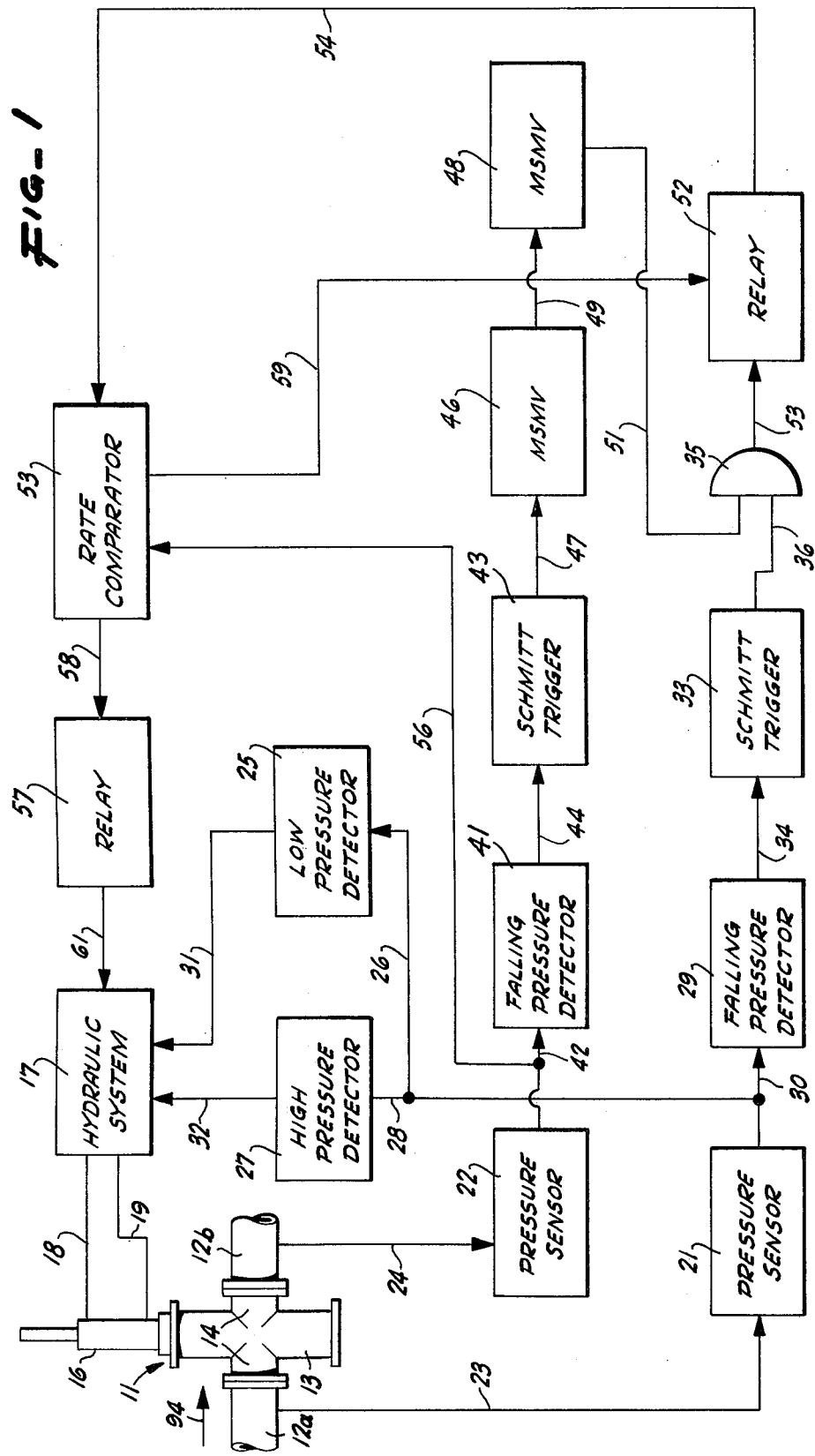
FIG. 1 is a block diagram of one embodiment of a line break control system according to the invention.

In FIG. 1, the line break control system is illustrated in connection with a gate valve 11 which controls the flow of liquid in a pipeline 12 having sections 12a and 12b disposed upstream and downstream, respectively, of the valve. The valve includes a valve body 13, aligned flow passages 14, and a valve gate connected to an operating rod movable between open and closed positions. The valve is equipped with a power operator 16 which in this instance is of the hydraulic type, such as a double acting piston and cylinder assembly, with the piston being connected to the operating rod of the valve. The ends of the cylinder are connected to a hydraulic system of known design which serves to supply liquid under pressure to one or the other of lines 18 and 19 for operating the valve.

Means is provided for sensing the static pressure conditions in pipeline 12 on the upstream and downstream sides of valve 11. This means comprises pressure sensors 21 and 22 which are connected to the pipeline by inlet pipes 23 and 24. The sensors are mounted on or close to the pipeline to minimize the lengths of the inlet pipes and the transit time of pressure waves in them. The points at which the inlet lines are connected to the pipeline are separated by a suitable distance, for example 250 feet, to permit the direction from which a negative pressure wave originates to be determined by its time of arrival at the two sensing points. Static pressure sensors 21 and 22 each include a pressure sensitive resistive element through which a constant current is passsed to provide an output voltage proportional to the static pressure in the pipeline.

The output of upstream pressure sensor 21 is connected to a low pressure detector 25 by a circuit 26, to a high pressure detector 27 by a circuit 28, and to a falling pressure 29 by a circuit 30. The low pressure detector delivers an output signal to hydraulic system 17 through a circuit 31 to close the valve whenever the static pressure on the upstream side of the valve is below a predetermined level and to reopen the valve when the pressure returns to the predetermined level. The high pressure detector delivers an output signal to the hydraulic system through a circuit 32 to prevent closing of the valve in the event that the pressure on the upstream side is greater than the pressure the pipeline can safely hold, e.g. 1,000 p.s.i.

Falling pressure detector 29 can be of a known type, and one such device which is particularly suitable for use in the present invention is disclosed in copending application Ser. No. 325,046, filed Jan. 19, 1973, now U.S. Pat. No. 3,851,521 and assigned to the assignee herein. It includes a capacitor which is charged to a level corresponding to the average static pressure in the line and a differential amplifier for comparing the incoming static pressure signal with the average pressure signal and providing an output signal if the pressure falls below the average level. The output of falling pressure detector 29 is connected to one input of a Schmitt trigger 33 by a circuit 34, and the output of the Schmitt trigger is connected to one input of an AND gate 35 by a circuit 36.

The output of pressure sensor 22 is connected to the input of a falling pressure detector 41, similar to falling pressure detector 29, by a circuit 42, and the output of this falling pressure detector is connected to the input of a Schmitt trigger 43 by a circuit 44. The output of Schmitt trigger 43 is connected to the input of a monostable or one-shot multivibrator 46. The output of multivibrator 46 is connected to the input of a second monostable or one-shot multivibrator 48 by a circuit 49.

Multivibrators 46 and 48 are chosen to have periods corresponding to the transit time of a negative pressure wave traveling between the points at which sensors 21 and 22 are connected to the pipeline. For example, with the sensors separated by a distance of 250 feet and a negative wave traveling at a speed of 4 feet per millisecond, multivibrators 46 and 48 might have periods of 40 milliseconds and 50 milliseconds, respectively. As will appear more fully hereinafter, multivibrator 46 fires as the negative wave passes sensor 22, and if the wave is moving upstream it will reach sensor 21 when multivibrator 48 is toward the center of its period in the example above.

The output of multivibrator 48 is applied to a second input of AND gate 35 by a circuit 51, and the output of the AND gate is connected to the input of a latching relay 52 through a circuit 53. The output of relay 52 is connected to a control input of a rate comparator 53 by a circuit 54. The rate comparator receives a pressure input signal from downstream pressure sensor 22 via a circuit 56, and it delivers an output signal to a relay 57 through a circuit 58. The rate comparator also delivers a reset signal to relay 52 through a circuit 59. The output of relay 57 is connected to a control input of hydraulic system 17 by a circuit 61.

Rate comparator 53 delivers an output signal to relay 57 in the event that the static pressure on the downstream side of the valve is dropping at a rate corresponding to a break in the line. A suitable form of rate comparator is described in detail in U.S. Pat. No. 3,665,945, issued May 30, 1973 to the assignee herein, and a generally similar rate comparator is shown in block form in FIG. 2. It includes a summation network 66 having a first input to which the downstream static pressure signal is applied by circuit 56. The output of the summation network is connected to one input of a difference amplifier 67 by a circuit 68. The difference amplifier receives a second input from a capacitor memory 69 through a circuit 71. The capacitor memory includes a capacitor which is charged by the difference amplifier through a circuit 72 to provide a reference signal having a level corresponding to the normal or average static pressure sensed in the downstream section of the pipeline. In the difference amplifier, the pressure signal is compared with the reference signal, and if the level of the pressure signal drops below that of the reference signal, the amplifier delivers an output signal through a circuit 73 to an AND gate 74. Control signals appearing on circuit 54 from relay 52 are applied to capacitor memory 69 and AND gate 74 by circuits 76 and 77, respectively.

The output of AND gate 74 is connected to a timer 81 and a ramp generator 82 by circuits 83 and 84, respectively. The timer delivers an output signal to relay 57 through circuit 58 a predetermined time (e.g. 30 seconds) after it is turned on. Ramp generator 56 produces a voltage ramp which increases in magnitude at a rate corresponding to the maximum rate of static pressure drop which would ordinarily be expected to occur in the pipeline in the absence of a break. The rate at which the ramp increases can be made adjustable to accomodate different pipeline conditions and it might, for example, cover a range on the order of 10 to 200 p.s.i. per minute.

The output of ramp generator 82 is connected to a second input of summation network 66 by a circuit 86. In the summation network, the ramp signal is added to the input pressure signal, and the combined signal is applied to the first input of amplifier 67 by circuit 68. In the difference amplifier, the combined signal is compared with the reference signal from capacitor memory 69, and the relative levels of the compared signals are monitored by a reset circuit 88 which is connected to the difference amplifier by a circuit 89. If the level of the combined signal exceeds that of the reference signal, reset circuit 88 delivers reset signals to timer 81 and ramp generator 82 through circuits 91 and 92, respectively, and also to relay 52 through circuit 59.

Figure 2:
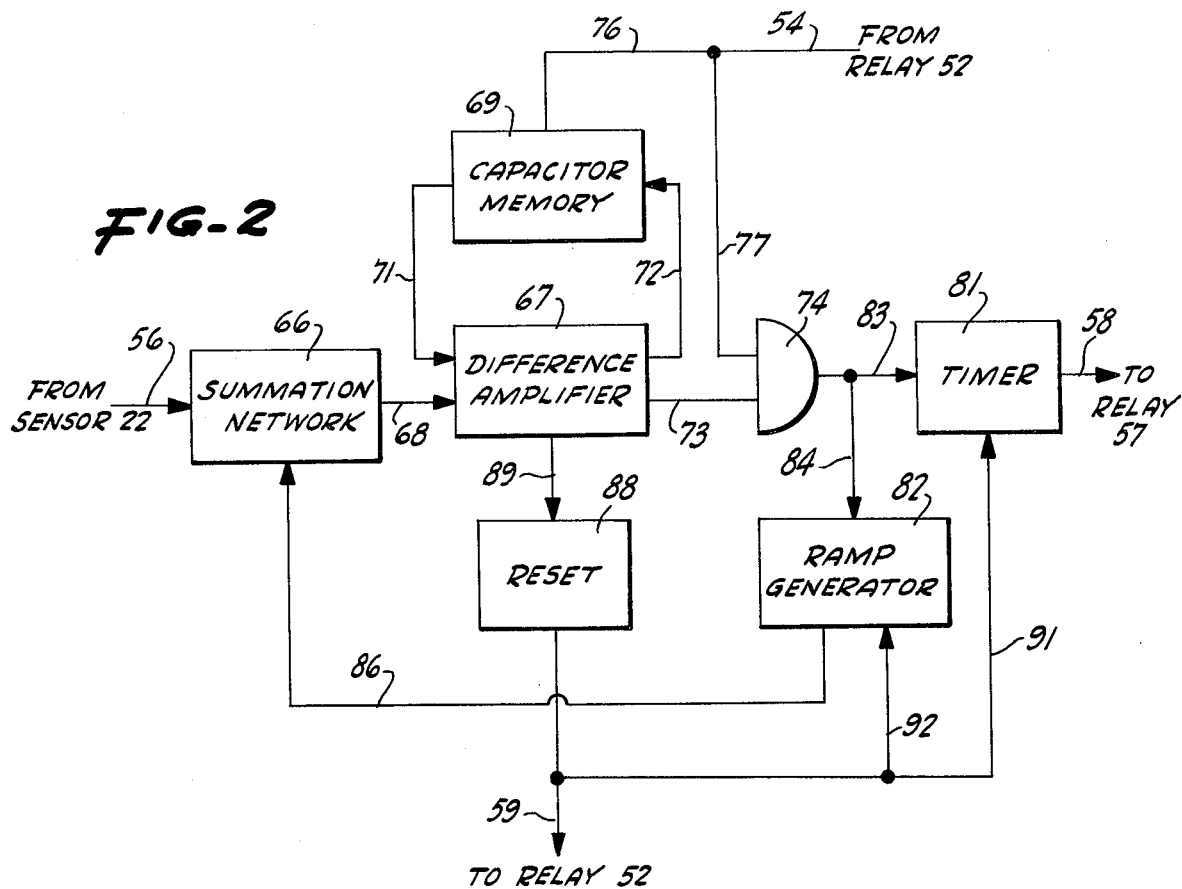
FIG. 2 is a block diagram of a preferred embodiment of the rate comparator of the system shown in FIG. 1.

Operation of the rate comparator shown in FIG. 2 can be described briefly. Under normal conditions, that is, when there is no break or negative pressure wave in the line, difference amplifier 67 charges the memory capacitor to a level corresponding to the average static pressure in the line. Timer 81 and ramp generator 82 remain in their off conditions. In the event of a line break accompanied by a negative pressure wave originating on the downstream side of the valve, relay 52 is actuated, as is discussed more fully hereinafter. Actuation of the relay delivers an enabling signal to AND gate 74 and causes the capacitor in memory 69 to hold the charge it then has so that the downstream pressure is compared with the pressure at the time the relay is actuated. If the downstream pressure is decreasing, AND gate 74 delivers an output signal to timer 81 and ramp generator 82, turning them both on. The output of the ramp generator is then added to the incoming pressure signal in summation network 66, and if the pressure signal is decreasing at a rate less than the maximum safe rate set by the ramp generator, the level of the combined signal will be greater than the level of the reference signal. In this event, reset circuit 88 will turn off the timer and ramp generator and deliver a reset signal to relay 52. If the incoming pressure signal is decreasing at a rate greater than the maximum safe rate set by the ramp generator, timer 81 will continue to operate, and at the end of its period it will deliver an output signal to relay 57 through circuits 58, indicating a break in the line.

It should be noted that the rate comparator will not respond to a decrease in the downstream pressure unless the decrease is preceeded by a negative pressure wave originating on the downstream side. Without the negative wave, AND gate 74 receives no enabling signal from relay 52, and timer 81 and ramp generator 82 remain turned off.

Operation and use of the line break control system and therein the method of the invention can be described as follows: During normal pipeline operation, valve 11 is open, and liquid flows through the line in the direction indicated by arrow 94. In the event of a sudden leak or break in the pipeline on the downstream side of the valve, a negative pressure wave will travel away from the break at a speed approximately the velocity of sound in the liquid. This negative wave will first be sensed by falling pressure detector 41 which is connected to downstream pressure sensor 22, and it will cause Schmitt trigger 43 to fire, firing multivibrator 46. When this multivibrator reaches the end of its period, multivibrator 48 fires, delivering an output signal to AND gate 35. When the negative pressure wave reaches upstream pressure sensor 21, it is detected by falling pressure detector 29, and Schmitt trigger 33 fires, delivering an output signal to AND gate 35. If the signal from Schmitt trigger 33 reaches AND gate 35 during the period of multivibrator 48, the AND gate delivers an output signal to relay 52 which is thereby latched in its energized condition. With the relay energized, rate comparator 53 is turned on, and the rate of static pressure drop on the downstream side of the valve is monitored in the manner described above. If this pressure is dropping faster than the predetermined safe rate, the rate comparator will deliver an output signal to relay 57. This relay then delivers a valve close command signal to hydraulic system 17, and the hydraulic system supplies fluid to valve operator 16 to close the valve. If the rate of pressure drop is less than the predetermined safe level, relay 52 will be reset before relay 57 can be energized, and the valve will remain open.

Next it is assumed that a negative pressure wave originates on the upstream side of the valve, as might, for example, happen when a pumping station shuts down on that side of the valve. This negative wave reaches pressure sensor 21 first, and it is detected by falling pressure detector 29. Schmitt trigger 33 fires, but since the negative wave has not yet been detected on the downstream side of the valve, multivibrator 48 is in its stable state. In this situation, AND gate 35 produces no output, relay 52 remains deenergized, and the rate comparator is not brought into operation. By the time the negative wave is detected on the downstream side and multivibrators 46 and 48 both fire, the output signal is gone from Schmitt trigger 33, and again there is no output from AND gate 35.

In the event that the static pressure on the upstream side of the valve drops below a predetermined level, this drop is detected by low pressure detector 25 which delivers an output signal to hydraulic system 17 to initiate closing of the valve.

In the event that the upstream pressure reaches a level which might cause the pipe to burst if the valve were closed or kept closed, high pressure sensor 27 delivers an output signal to hydraulic system 17 to open the valve and/or keep it from closing even though signals which would otherwise close the valve may be present.

Figure 3:
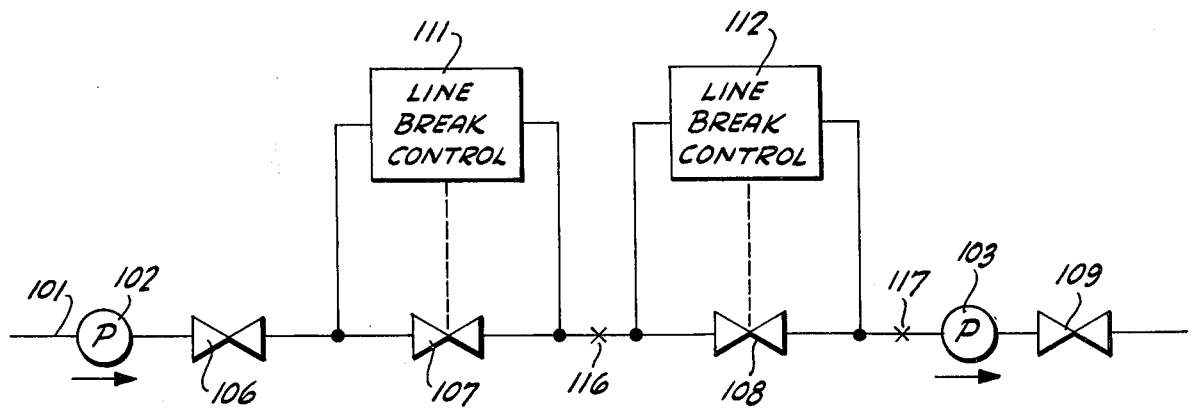
FIG. 3 is a schematic diagram illustrating the use of the apparatus of FIGS. 1 and 2 in a pipeline system.

In FIG. 3, the invention is illustrated in connection with a pipeline 101 having an upstream pumping station 102, a downstream pumping station 103, and flow control valves 106–109 located as illustrated. Valves 107 and 108 are provided with line break controls 111 and 112 of the type described above.

During normal pipeline operation, shutting down pumping station 102 or closing valve 106 may produce negative pressure waves in the line. Since these negative waves occurs upstream of the line break controls, the controls do not respond to them, and normal operation of the pipeline continues without interruption. Similarly, negative pressure waves produced by the shutting down of pumping station 103 or the closing of valve 109 have no appreciable effect on the break controls because the negative wave is for the most part confined to the downstream side of the pump and the suction pressure on the inlet side of the pump remains substantially constant. A break occuring at point 116 between the line break controls will cause control 111 to close valve 107. When valve 107 closes, the low pressure detector in control 112 senses the upstream drop in pressure and initiates the closing of valve 108, isolating the break.

Figure 4:
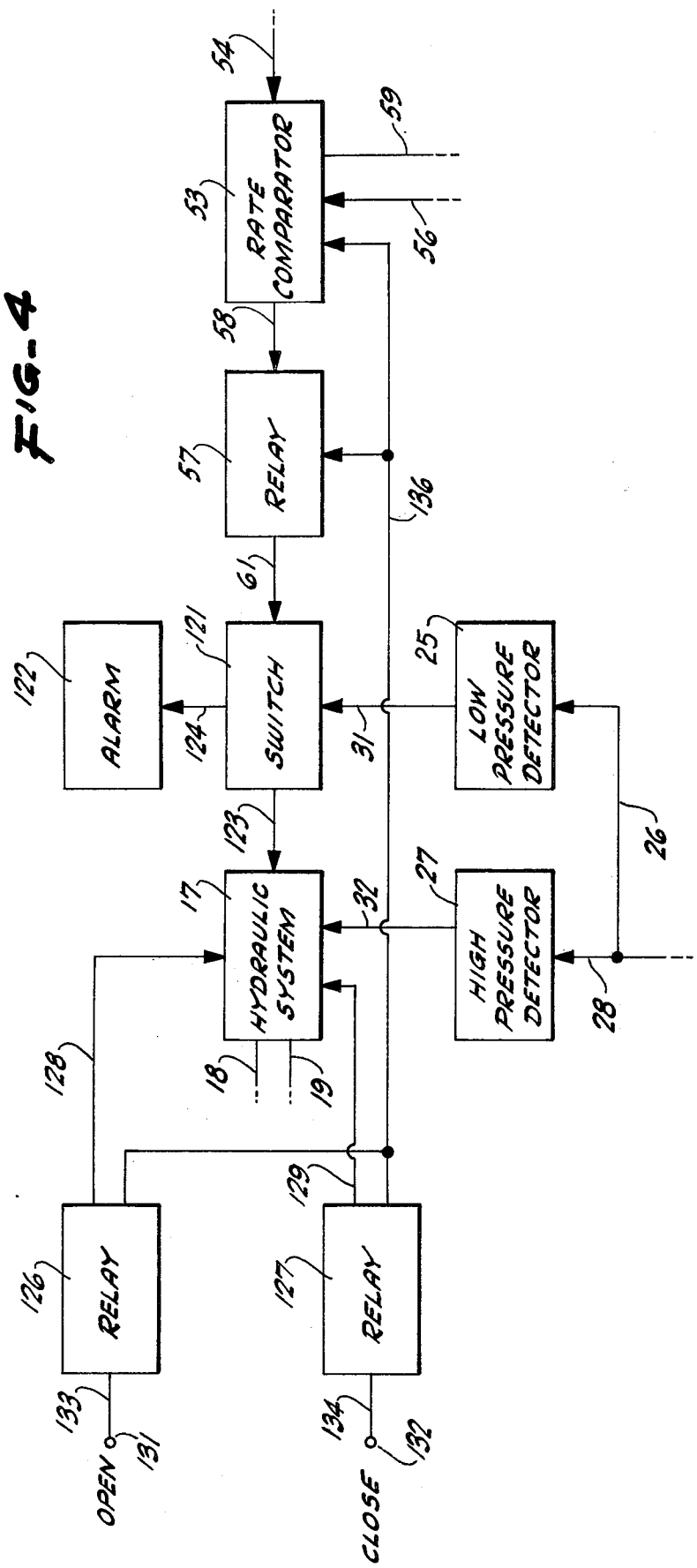
FIG. 4 is a block diagram of the output stages of another embodiment of a line break control system according to the invention, with means for operating a flow control valve either manually or automatically.

The line break control system shown in FIG. 4 is generally similar to the embodiment of FIGS. 1–3, except that the output stages are modified to permit either manual or automatic valve operation. In the FIG. 4 embodiment, the outputs of low pressure detector 25 and relay 57 are connected to the input terminals of a switch 121 by circuits 31 and 61, respectively. The output terminals of the switch are connected to hydraulic system 17 and alarm 122 by circuits 123 and 124, respectively. In the preferred embodiment, switch 121 is a manually operable switch of a type suitable for selectively connecting thee input terminals to either or both sets of output terminals. Alarm 122 is a suitable device of known design for providing a desired indication or record of a leak or break, and it can be located remotely of the pipeline, for example, at a monitoring station, if desired.

Means is provided for applying control signals to hydraulic system 17 in response to command signals from remote locations. This means includes relays 126, 127 which are connected to hydraulic system 17 by circuits 128, 129 for conditioning the hydraulic system to open and close the valve. Relays 126 and 127 receive OPEN and CLOSE command signals from input terminals 131 and 132, respectively via circuits 133 and 134. In a preferred embodiment, the input terminals are located at a remotely situated monitoring station with alarm 122, and circuits 124, 133 and 134 are suitable transmission lines. Alternatively, if desired, signals can be transmitted between the monitoring station and the pipeline by other suitable means such as telemetry. The outputs of relays 126 and 127 are also connected to a reset line 136 which is connected to reset inputs of rate comparator 53 and relay 57.

Operation and use of the embodiment of FIG. 4 and therein the method of the invention can be described as follows: When switch 121 is in its automatic position, the outputs of low pressure detector 25 and relay 57 are applied to hydraulic system 17, and the system operates in the manner described above in connection with FIGS. 1–3. When switch 121 is in its manual position, the outputs of low pressure detector 26 and relay 57 are applied to the input of alarm 122, and in the event of an output signal from either the low pressure detector or the relay, the alarm is actuated. Upon actuation of the alarm, an operator at a remote station can close valve 11 by applying a command signal to input terminal 132. Thereafter, the valve can be reopened from the remote station by applying a command signal to input terminal 131.

The invention has a number of important features and advantages. It makes it possible to close flow control valves in liquid pipelines automatically in the event of a leak or break, thereby isolating the portion of the line in which the leak or break occurs. The danger of shutting down a pipeline unnecessarily in response to the action of a pump or valve in the normal operation of the pipeline is minimized, and the occurrence of a leak or break can be indicated by an alarm if desired.

It is apparent from the foregoing that a new and improved line break control system and method have been provided. While only the presently preferred embodiments have been disclosed, as will be apparent to those familiar with the art, certain changes and modifications can be made without departing from the scope of the invention as defined by the following claims.

I claim:

1. In a method for controlling the operation of a valve controlling fluid flow in a pipeline to close the valve in the event of a leak or break in the line, the steps of: monitoring the static fluid pressure in the pipeline to detect the occurrence of a negative pressure wave originating on the downstream side of the valve, distinguishing said wave from a like wave originating on the upstream side, monitoring the rate of static pressure drop on the downstream side in the event that a negative pressure wave originating on that side of the valve is detected, and closing the valve in the event that the pressure on the downstream side decreases faster than a predetermined rate after the negative pressure wave is detected.

2. The method of claim 1 wherein a negative pressure wave originating on the downstream side of the valve is detected by sensing the static pressure in the pipeline on the upstream and downstream sides of the valve and providing an output signal in the event of a rapid drop in the downstream pressure followed by a corresponding drop in the upstream pressure.

3. The method of claim 1 together with the additional steps of monitoring the level of the static pressure on the upstream side of the valve and closing the valve in the event that said pressure falls below a predetermined level.

4. The method of claim 1 wherein a pumping station is connected to the pipeline on the upstream side of the valve and shut-down of the pipeline in response to a negative pressure wave generated by normal operation of the pumping station is avoided by the steps of sensing the static pressures at points on the upstream and downstream sides of the valve, said points being spaced apart by a predetermined distance, detecting the arrival of a negative pressure wave at each of said points, and responding to the wave only in the event that it arrives at the downstream point at a predetermined time before it arrives at the upstream point.

5. The method of claim 1 together with the additional steps of monitoring the level of the static pressure on the upstream side of the valve and inhibiting valve closure in the event that the pressure exceeds a predetermined level.

6. In a system for controlling the operation of a valve controlling the flow in a pipeline to close the valve in the event of a leak or break in the line: means for detecting the occurrence of a negative pressure wave originating on the downstream side of the valve, and distinguishing said wave from a like wave originating on the upstream side, means for monitoring the rate of static pressure drop on the downstream side in the event that a negative pressure wave originating on that side of the valve is detected, and means for initiating closure of the valve in the event that the pressure on the downstream side decreases faster than a predetermined rate after the negative pressure wave is detected.

7. The system of claim 6 wherein the means for detecting the occurrence of a negative pressure wave comprises means for detecting falling static pressures on the upstream and downstream sides of the valve and means for providing an output signal in the event that a falling pressure is detected on the downstream side and thereafter a falling pressure is detected on the upstream side.

8. The system of claim 6 further including means for monitoring the pressure on the upstream side of the valve and providing a signal for closing the valve in the event that said pressure falls below a predetermined level.

9. The system of claim 6 further including means for monitoring the level of the static pressure on the upstream side of the valve and inhibiting valve closure in the event that the pressure exceeds a predetermined level.

10. In a method for controlling the operation of a valve controlling the flow in a pipeline to close the valve in the event of a leak or break in the line, the steps of: providing electrical signals corresponding to the static pressures on the upstream and downstream sides of the valve, monitoring the signals to detect falling pressures on the upstream and downstream sides, providing an output signal in the event that a falling pressure is detected on the downstream side and thereafter a falling pressure is detected on the upstream side, monitoring the signal corresponding to the downstream pressure in the event of an output signal to determine whether said pressure is decreasing faster than a predetermined rate, and delivering a control signal for closing the valve in the event that the downstream pressure is decreasing faster than the predetermined rate.

11. The method of claim 10 further including the steps of monitoring the signal corresponding to the upstream pressure and delivering a control signal for closing the valve in the event that said pressure drops below a predetermined level.

12. The method of claim 10 further including the step of selectively applying the control signal to an alarm to actuate the same.

13. The method of claim 10 further including the steps of monitoring the signal corresponding to the upstream pressure and delivering an inhibit signal for preventing valve closure in the event that the pressure exceeds a predetermined level.

14. In a system for controlling the operation of a valve controlling the flow in a pipeline to close the valve in the event of a leak or break in the line: means for providing electrical signals corresponding to the static pressures on the upstream and downstream sides of the valve, means responsive to the signals for detecting falling pressures and providing an output signal in the event of a falling pressure on the downstream side followed by a falling pressure on the upstream side, and means for monitoring the downstream pressure signal in the event of an output signal and delivering a control signal to initiate closure of the valve in the event that the downstream pressure decreases faster than a predetermined rate.

15. The system of claim 14 further including means responsive to the upstream pressure signal for delivering a control signal for initiating closure of the valve in the event that the upstream pressure falls below a predetermined level.

16. The system of claim 14 further including means for monitoring the signal corresponding to the upstream pressure and delivering an inhibit signal for preventing valve closure in the event that the pressure exceeds a predetermined level.

17. The system of claim 14 wherein the means for detecting falling pressures and providing an output signal includes falling pressure detectors for monitoring the signals corresponding to pressure on the upstream and downstream sides and delivering output signals in the event that the pressure signals change in a predetermined manner, first timing means for delivering an output signal a predetermined time after the occurrence of an output signal from the falling pressure detector for the downstream side of the valve, second timing means for delivering a signal of predetermined duration in response to the output signal from the first timing means, and gating means responsive to signals from the second timing means and the upstream falling pressure detector for delivering an output signal upon conjoint receipt of an output signal from said detector and a signal from said timing means.

18. The system of claim 17 wherein the first and second timing means are one-shot multivibrators.

19. The system of claim 14 further including an alarm and means for applying the control signal to the alarm to actuate the same.

20. The system of claim 19 wherein the means for applying the control signal comprises switch means for selectively applying the signal to initiate closure of the valve or to actuate the alarm.

* * * * *